July 4, 1961  J. R. MORGAN ET AL  2,991,036
MAGNETIC BOX HOLDING BRACKET
Filed Jan. 11, 1960

JAMES RUSSELL MORGAN
JOHN MEREDITH HIGH
INVENTORS.
BY

United States Patent Office 2,991,036
Patented July 4, 1961

2,991,036
MAGNETIC BOX HOLDING BRACKET
James Russell Morgan, 2930 SE. 74th Ave., Portland, Oreg., and John Meredith High, Topeka, Kans. (1227 Mitchell Ave., Larson Air Force Base, Wash.)
Filed Jan. 11, 1960, Ser. No. 1,691
4 Claims. (Cl. 248—206)

This invention relates to an adjustable bracket, with magnets affixed thereto, for grasping and holding small cardboard boxes, such as those designed for dispensing facial tissues.

An important object of the invention is to provide an economical, easily removable system for attaching such cardboard boxes to metallic surfaces which have an attraction for magnets.

The invention is illustrated in the accompanying drawing in which.

Each of the two slide devices, indicated in general by the numerals 11 and 12, which embody the invention may be made from a single piece of sheet metal cut to shape and bent to the form illustrated in the accompanying drawing. High density plastic, wood, or any other substance possessing sufficient strength and rigidity may be used to form the slide devices.

Magnets are attached to the slide devices as described below. Any suitable means, for example a rivet, screw, bond, weld, clamp or adhesive, may be used to attach the magnets to the slide devices.

Figure 1:
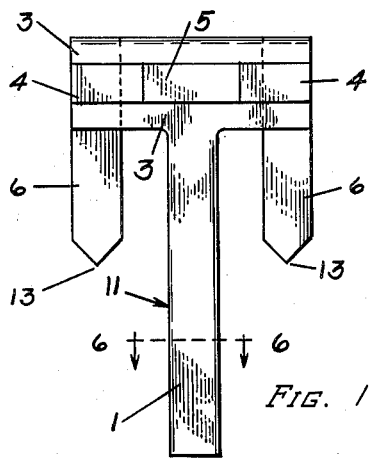
FIGURE 1 is a top view of one of the two slide devices which embody the invention.
Figure 4:
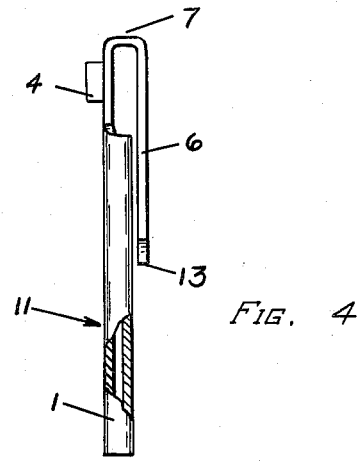
FIGURE 4 is a side view of the slide device illustrated in FIGURE 1.
Figure 2:
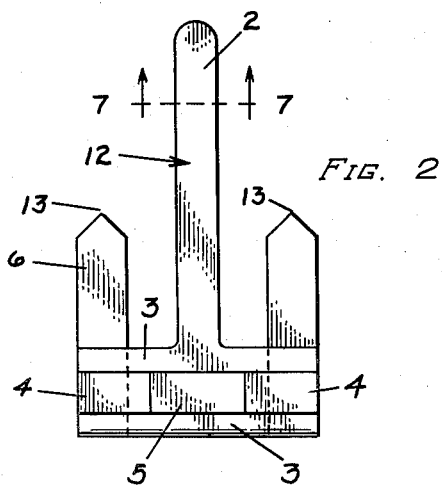
FIGURE 2 is a top view of the other one of the two slide devices.
Figure 5:
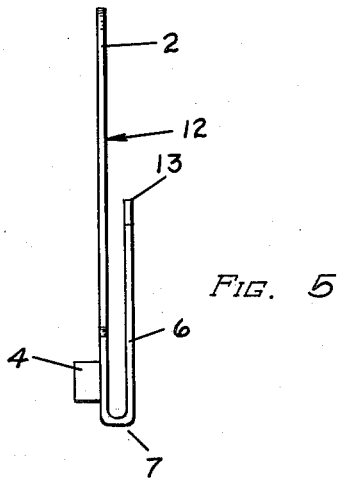
FIGURE 5 is a side view of the slide device illustrated in FIGURE 2.
Figure 3:
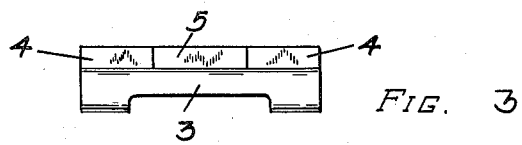
FIGURE 3 is an end view of a slide device.
Figure 6:
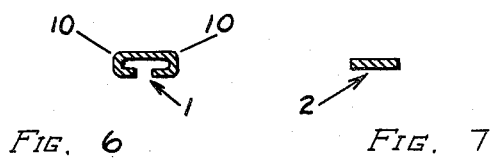
FIGURE 6 is a section on a plane indicated by line 6—6 of FIGURE 1, and looking in the direction of the arrows.
Figure 7:
FIGURE 7 is a section on a plane indicated by line 7—7 of FIGURE 2, and looking in the direction of the arrows.

Each of the two slide devices which embody the invention is shaped like the letter T. The two slide devices differ only in the forming of the shaft of the T. The shaft 1 of the slide device 11 is formed so that the shaft 2 of the slide device 12 may be slidably received within the former. The tolerance between the surfaces of the sliding shafts 1 and 2 is such as to cause friction and such as to hold the shafts extended in any relative position at which they are manually set. The edges of the shaft 1 are folded to provide spaced channels 10 at each side as illustrated in FIGURE 6.

At each end of the crossbar 3 of each slide device is a prong 6 which is bent at 7 and folded to extend in the same direction as its respective shaft 1 or 2. The ends of the prongs 6 are shaped into points 13 to facilitate the puncture of cardboard or similarly permeable substances.

At each end of each crossbar 3 a magnet 4 is attached on the upper surface, i.e. the surface of the slide device opposite the prongs 6. The space between the magnets 4 is filled with a nonmagnetic bar 5 the surface of which is flush with the surfaces of the magnets 4.

Although the invention may be manufactured to any desired scale, it is contemplated that the principal use for the invention will be to hold the facial tissue cartons which are ten inches in length and 5 inches in width.

It should be understood that the drawings are exemplifying and no intent to limit the scope of the invention to that structure disclosed is to be assumed, but, rather, we desire to secure to ourselves the broad invention limited only by the prior art as defined in the appended claims.

We claim:

1. An adjustable bracket for holding cardboard cartons, comprising: a pair of T-shaped coacting slide devices, the shaft of one slide being provided with channels to receive the shaft of the other, each device including a crossbar on one end thereof, a pointed prong on each extremity of said crossbar and extending in the same direction as the shaft, the pair of prongs on one device arranged in opposed relation to the pair on the other device, the prongs being laterally offset from the crossbars to provide clearance for the wall of a carton impaled on said prongs, and magnets attached to the extremities of said crossbars on the surface opposite said prongs.

2. An adjustable bracket for holding cardboard cartons, comprising: a pair of cooperating devices, means adjustably uniting said devices for manually selective movements toward and away from each other, each device including a crossbar on one end thereof, a pointed prong on each extremity of said crossbar and extending toward the prongs on the other device, the prongs being laterally offset from the crossbars to provide clearance for the wall of a carton impaled on said prongs, and magnets attached to the extremities of said crossbars on the surface opposite said prongs.

3. An adjustable bracket for holding cardboard cartons, comprising: a pair of cooperating devices each including a crossbar, a pointed prong on each extremity of said crossbars, the pair of prongs of one crossbar arranged in opposed relation to the pair on the other, said prongs being laterally offset from the crossbars to provide clearance for the wall of a carton impaled on said prongs, and magnets attached to the extremities of said crossbars on the surface opposite to said prongs.

4. An adjustable bracket for holding cardboard cartons, comprising: a pair of cooperating devices each having a shaft, the shafts of the device being telescopically united for adjustments longitudinally thereof, at least one pointed prong on the outer end of each shaft and extending in the same direction as its respective shaft, and arranged in opposed relationship to the prong on the other shaft, said prongs being laterally offset from the shafts to provide clearance for the wall of a carton impaled on said prongs, and magnets attached to the surface of said devices opposite to said prongs.

References Cited in the file of this patent

UNITED STATES PATENTS

| | | |
|---|---|---|
| 1,022,149 | Maphet | Apr. 2, 1912 |
| 2,336,315 | Thomas | Dec. 7, 1943 |
| 2,389,298 | Ellis | Nov. 20, 1945 |
| 2,641,793 | Wilm | June 16, 1953 |
| 2,642,999 | McPherson | June 23, 1953 |
| 2,836,386 | Iverson | May 27, 1958 |